(12) United States Patent
DeLuca et al.

(10) Patent No.: US 9,723,039 B2
(45) Date of Patent: *Aug. 1, 2017

(54) DYNAMIC PROFILE SHARING USING EXPIRING TOKENS (71) Applicant: International Business Machines Corporation, Armonk, NY (US)

(72) Inventors: Lisa Seacat DeLuca, Baltimore, MD (US); Lydia M. Do, Raleigh, NC (US); Geetika T. Lakshmanan, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,384

(22) Filed: Jan. 9, 2017

(65) Prior Publication Data
US 2017/0111410 A1    Apr. 20, 2017

Related U.S. Application Data (63) Continuation of application No. 14/157,604, filed on Jan. 17, 2014.

(51) Int. Cl.
G06F 7/04        (2006.01)
G06F 15/16       (2006.01)
(Continued)

(52) U.S. Cl.
CPC ............ H04L 65/403 (2013.01); H04L 43/16 (2013.01); H04L 63/107 (2013.01); H04L 67/18 (2013.01);
(Continued)

(58) Field of Classification Search
CPC .... G06Q 2220/00; G06Q 20/22; G06Q 20/32; G06Q 20/322; G06Q 20/3224; G06Q 30/0281; H04W 12/06; H04W 12/08; H04W 4/008; H04W 4/02; H04W 8/20; H04L 63/102; H04L 63/107; G06F 2221/2111

See application file for complete search history.

(56) References Cited

U.S. PATENT DOCUMENTS 6,055,637 A    4/2000  Hudson et al.
6,898,711 B1 * 5/2005  Bauman ................ G06F 21/31
                                                713/182
(Continued)

FOREIGN PATENT DOCUMENTS

WO    2008044103 A1    4/2008

OTHER PUBLICATIONS

Mell et al., "The NIST Definition of Cloud Computing", Version 15, Oct. 7, 2009.
(Continued)

Primary Examiner — Daniel Potratz
(74) Attorney, Agent, or Firm — Reza Sarbakhsh (57) ABSTRACT

Access to a user profile of a user device at a location may be provided to a destination device upon detecting that the location is within a proximity of a destination location. An expiring token may be generated, associated with the user profile, and communicated to the second device. Access to the user profile provided to the destination device may be terminated upon an expiration of the expiring token.

1 Claim, 6 Drawing Sheets (51) Int. Cl.
*G06F 17/30* (2006.01)
*H04L 29/06* (2006.01)
*H04L 12/26* (2006.01)
*H04L 29/08* (2006.01)
*H04W 4/02* (2009.01)
*G06Q 20/32* (2012.01)

(52) U.S. Cl.
CPC ............ *H04L 67/306* (2013.01); *H04W 4/02* (2013.01); *H04W 4/021* (2013.01); *G06F 2221/2111* (2013.01); *G06Q 20/3224* (2013.01)

(56) References Cited

U.S. PATENT DOCUMENTS

| | | | | |
|---|---|---|---|---|
| 7,149,806 | B2* | 12/2006 | Perkins | G06F 21/335 709/203 |
| 7,660,737 | B1 | 2/2010 | Lim et al. | |
| 8,140,403 | B2 | 3/2012 | Ramalingam et al. | |
| 8,255,284 | B1 | 8/2012 | Ramalingam et al. | |
| 8,285,308 | B1 | 10/2012 | Wright et al. | |
| 8,306,921 | B2 | 11/2012 | Kalik et al. | |
| 8,321,278 | B2 | 11/2012 | Haveliwala et al. | |
| 8,326,361 | B2 | 12/2012 | Celik | |
| 8,380,192 | B2 | 2/2013 | Kim et al. | |
| 8,498,940 | B2* | 7/2013 | Pelegero | G06Q 20/10 705/44 |
| 8,739,264 | B1 | 5/2014 | Eddings et al. | |
| 9,094,209 | B2* | 7/2015 | Zon | H04L 9/3226 |
| 9,374,363 | B1* | 6/2016 | Paczkowski | H04L 63/083 |
| 2007/0241861 | A1 | 10/2007 | Venkatanna et al. | |
| 2008/0134347 | A1 | 6/2008 | Goyal et al. | |
| 2008/0183852 | A1 | 7/2008 | Pramer et al. | |
| 2008/0305832 | A1 | 12/2008 | Greenberg | |
| 2011/0126132 | A1 | 5/2011 | Anderson et al. | |
| 2011/0276563 | A1 | 11/2011 | Sandoval et al. | |
| 2012/0252418 | A1 | 10/2012 | Kandekar et al. | |
| 2012/0323717 | A1 | 12/2012 | Kirsch | |
| 2013/0035114 | A1 | 2/2013 | Holden et al. | |
| 2013/0124494 | A1 | 5/2013 | Ranjan et al. | |
| 2013/0244614 | A1 | 9/2013 | Santamaria et al. | |
| 2013/0268687 | A1 | 10/2013 | Schrecker | |
| 2013/0282438 | A1 | 10/2013 | Hunter et al. | |
| 2014/0187162 | A1* | 7/2014 | Mei | H04W 4/023 455/41.2 |
| 2014/0315571 | A1* | 10/2014 | Saari | H04W 64/00 455/456.1 |
| 2016/0057238 | A1* | 2/2016 | Oldacre | H04W 4/025 705/14.66 |

OTHER PUBLICATIONS

Deluca et al., Pending U.S. Appl. No. 15/401,399, filed Jan. 9, 2017, titled "Dynamic Profile Sharing Using Expiring Tokens," pp. 1-34.

Deluca et al., Pending U.S. Appl. No. 14/157,604, filed Jan. 17, 2014, titled "Dynamic Profile Sharing Using Expiring Tokens," pp. 1-35.

Deluca et al., Pending U.S. Appl. No. 15/068,879, filed Mar. 14, 2016, titled "Dynamic Profile Sharing Using Expiring Tokens," pp. 1-33.

* cited by examiner

FIG. 1

| Profile 250 |||||| 
|---|---|---|---|---|---|
| Restaurant Profile 210A | Name | Phone No. | Number In Party & Seating Preferences | Allergies | Billing Information |
| Hospital Profile 210B | Name | Phone No. | Address | Medical History Including Allergies | Insurance Information |
| Vehicle Rental Profile 210C | Name | Phone No. | Address | Age | Insurance Information |
| Retail Outlet Profile 210D | Name | Phone No. | Address | Measurements | Billing Information |

DYNAMIC PROFILE SHARING USING EXPIRING TOKENS

FIELD OF THE INVENTION

The present disclosure generally relates to mobile electronic devices, and more particularly to sharing of information between a mobile electronic device and other electronic devices, including via a cloud computing platform.

BACKGROUND

Current technology allows electronic devices, including mobile devices, to share information through various data communications protocols. These solutions are limited in that they do not provide for dynamic and context specific sharing of information.

BRIEF SUMMARY

Aspects of the present disclosure include a method, system, and computer program product for dynamically sharing a profile of a mobile device. Access may be provided to a user profile of a user device having a first location, to a destination device, upon detecting that the first location of the first device is within a geographic proximity of a second location, wherein the second device and the first profile are associated with the second location. An expiring token may be generated. The expiring token may be associated with the first profile. The expiring token may be communicated to the second device. Access to the first profile to the second device may be terminated upon an expiration of the expiring token.

DETAILED DESCRIPTION

As will be described below, embodiments of the present disclosure provide for dynamic, controlled, and context specific sharing of a user profile associated with a user device, and a destination device, based on the location of the user device and a destination location.

Figure 1:
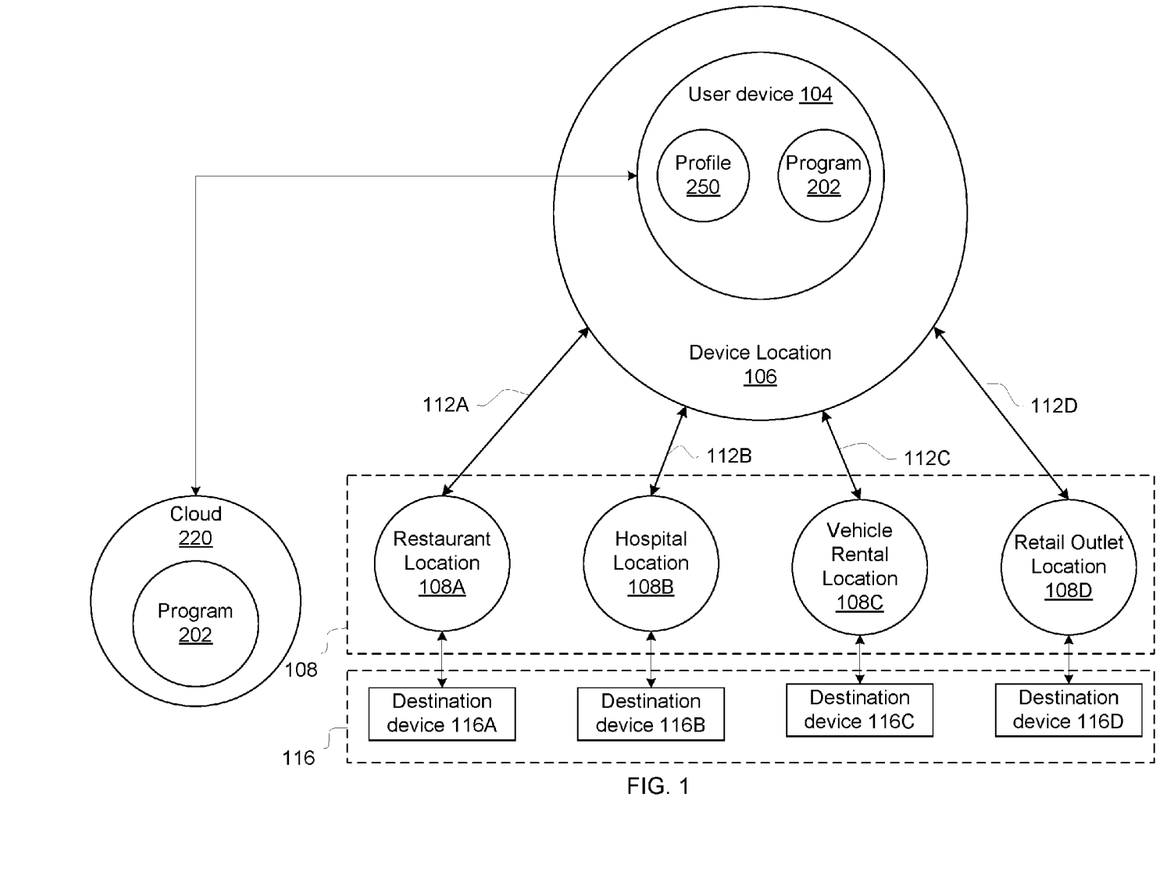
FIG. 1 is a schematic block diagram depicting an operational environment of a first device at a first location within a geographic proximity of one or more additional locations, according to an aspect of the present disclosure.

Referring now to FIG. 1, according to an exemplary embodiment of the present disclosure, a system for dynamically sharing a user profile of a device may include a user device 104. The user device 104 may be a computer device such as, without limitation: a smart phone, cellular phone, laptop computer, tablet computer, a computer system of a vehicle, or a device described below in connection with FIG. 4.

The user device 104 may include a user profile 250 and a program 202, embodied on a tangible storage medium thereof, as described in greater detail below.

Figure 2:
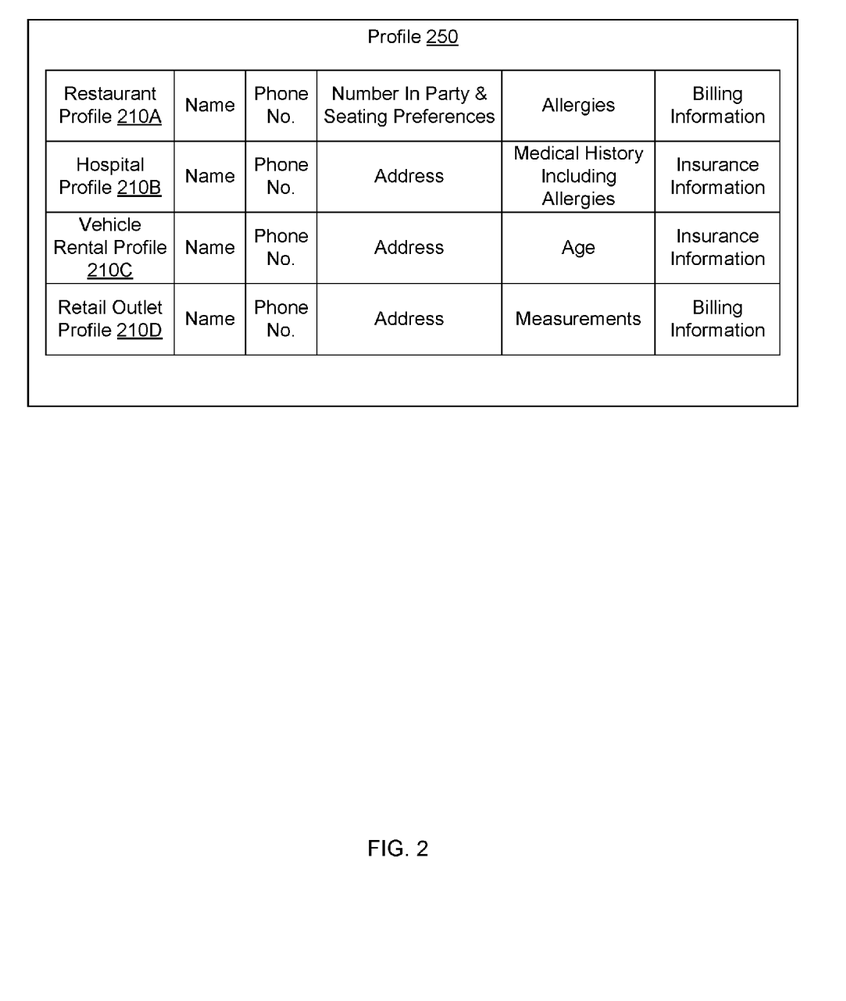
FIG. 2 is a schematic block diagram depicting a profile associated with the first device residing on the first device or on the cloud system depicted in FIG. 1, according to an aspect of the present disclosure.

Referring now to FIGS. 1 and 2, the user device 104 (FIG. 1) may include a digital user profile 250 (FIGS. 1 and 2) associated with the user device 104. The user profile 250 may include data associated with the user device 104 and/or with a user or operator of the user device 104. The association may be implemented using, for example, metadata of the user profile 250 that indicates an ID of the user device 104. The user profile 250 associated with the user device 104 may be organized as a record having discrete pieces of information. These may include, in one embodiment, name, age, car insurance policy number, health insurance information, etc., associated with the operator of the user device 104.

With continued reference to FIGS. 1 and 2, the user profile 250 (FIG. 1) and the information it contains may be a collection of constituent user profiles 210 (FIG. 2) based on combinations of these discrete pieces of information. Which of these combinations are used to form a constituent user profile may be determined dynamically, for example, by the operator of the user device 104 (FIG. 1). Alternatively, each of the constituent user profiles 210 may include a distinct copy of the information it references. For example, each of two constituent user profiles 210 may have a distinct copy of a "name" record.

Referring now to FIG. 1, the user profile 250 and/or its constituent user profiles 210 (FIG. 2) may also be associated with one or more destination locations 108. The association may be implemented using, for example, metadata of the user profile 250 that includes an ID of a given destination location 108. Destination locations 108 are described in greater detail, below.

The user profile 250 and/or its constituent user profiles may also be associated with one or more destination devices 116. The association may be implemented using, for example, metadata of the user profile 250 that indicates an ID of the destination device(s) 116. The destination devices 116 are described in greater detail, below.

Information stored as part of the user profile 250, associated with the user device 104, may be stored locally on the user device 104, for example, on a tangible storage medium of the user device 104. Alternatively, the user profile 250 may be stored on a tangible storage medium that is part of a Cloud system 220, described in greater detail, below. The user profile 250 may also be stored on both the user device 104 and on the Cloud system 220 as distinct versions, and each version may be synchronized with the other, according to any synchronization policy known in the art.

With continued reference to FIGS. 1 and 2, according to an aspect of the present disclosure, the user profile 250 may include, for example, the following constituent profiles:

A Restaurant Profile 210A (FIG. 2) comprising information related to a restaurant patron and the patron's visit to and use of dining services at a restaurant. The patron may be, for example, an operator of the user device 104 (FIG. 1). The Restaurant Profile 210A may, in one embodiment, contain the following information associated with the user device 104 and/or the patron: name, phone number, number of people typically in the patron's party when dining at a restaurant (for example, at the Restaurant Location 108A), the patron's allergies, and the user's billing information. It may further include seating preferences, preferred menu items, and additional information.

A Hospital Profile 210B (FIG. 2) comprising information related to a hospital patient and the patient's visit(s) to and receipt of healthcare services at a hospital. The patient may be, for example, a operator of the user device 104. The Hospital Profile 210B may, in one embodiment, contain the following information associated with the user device 104 and/or the patient, including: name, phone number, address, medical history including allergies, and insurance information. Such information may include Electronic Medical Records (EMRs). Although the Hospital Profile 210B may share some information with another profile, for example, the Restaurant Profile 210A, the user device 104 maintains control over which user profile contains what information, and thereby conveniently and automatically regulates sharing of the information.

A Vehicle Rental Profile 210C (FIG. 2) comprising information related to a vehicle renter and a visit by the renter to and use of vehicle rental services at a vehicle rental facility. The Vehicle Rental Profile 210C may include, in one example, the following information associated with the renter and/or the user device 104: Name, phone number, address, age, and insurance information. Although the Vehicle Rental Profile 210C may share information with other profiles associated with the user device 104, breaking down the information into individual user profiles allows the user device 104 to regulate sharing of information.

A Retail Outlet Profile 210D (FIG. 2) comprising information related to a shopper and a visit by the shopper to and use of sales services at a retail outlet. The shopper may be, for example, an operator of the user device 104. The Retail Outlet Profile 210D may include, in one example, the following information associated with the shopper and/or the user device 104: name, phone number, address, clothing measurements (e.g., shoe size, dress size, etc.), billing information, household info, age, marital status, number of children, age of children, number of vehicles owned, age of house, etc. Although the Retail Outlet Profile 210D may share some information with other user profiles associated with the user device 104, breaking down the user profile 250 into individual user profiles allows for dynamic and context-specific sharing of such information.

Referring again to FIG. 1, the user device 104 may be located at a user device location 106. The user device location 106 may be a geographic location of the user device 106, and it may be an absolute value, such as a pair of global positioning satellite (GPS) coordinates. Alternatively, the user device location 106 may be a relative value, such as "10 feet from a second location".

The user device location 106 may be detected in many ways, including, for example, by a monitoring system, using global positioning satellite (GPS) systems, WIFI signals, Radio Frequency Identification (RFID) systems, or any other location tracking technology that can detect the presence of the user device 104.

With continued reference to FIG. 1, based on its user device location 106, the user device 104 may have a proximity 112 to a destination location 108. The destination location 108 may be a geographical location, and it may be a single value, such as a pair of GPS coordinates. The destination location 108 may be monitored and/or detected in many ways, including, for example, through GPS systems, WIFI signals, RFID systems, or any other location tracking technology that can detect the location of the destination location. According to an exemplary embodiment of the present disclosure, as depicted in FIG. 1, a destination location 108 may include: a Restaurant Location 108A, a Hospital Location 108B, a Vehicle Rental Location 108C, and a Retail Outlet Location 108D.

The user device 104 may have a proximity (not shown) to a destination device 116 where the destination device 116 is located at the destination location 108. This may be the case where, for example, the destination device 116 monitors and detects the proximity of the user device 104 to the location 116.

The destination device 116 may be a device similar to the user device 104, or a different device including, for example: a smart phone, tablet computer, desktop computer, or other electronic device as described in connection with FIG. 4, below.

The destination device 116 may be located at the destination location 108, or it may be located at a different location. In either case, the destination device 116 may be associated with the destination location 108. The association may be, for example, by way of an ID of the destination location 108 being included as metadata stored on a tangible storage medium of the destination device 116, and or a storage medium of the user device 104, or both.

The destination device 116 may be associated with the user profile 250, or a constituent profile 210 (FIG. 2). The association may be by way of metadata of the user profile 250 or a constituent profile 210 indicating an ID of the destination device 116.

The location of the destination device 116 may be detected in many ways, including, for example, through GPS systems, WIFI signals, RFID systems, or any other location tracking technology that can detect the location of the destination device 116.

In exemplary embodiments of the present disclosure, the destination device 116A may be a reservation computer or computer system of a restaurant at the Restaurant Location 108A, a hospital patient intake system 116B at the Hospital Location 108B, a client reservation system 116C at the Vehicle Rental Location 108B, or a customer service device 116D at the Retail Outlet Location 108D. The destination device 116 need not be located at the second location. For example, in the case of a restaurant that is geographically located at the Restaurant Location 108A, the destination device may be geographically located at a different location.

According to an exemplary embodiment, the user profile 250 information to which the destination device 116 gains access through the program 202, described below, may be used by the destination device 116 (and/or an operator of the destination device 116) to provide information, goods, and/or services to the user device 104 (and/or to the operator of the user device 104). In the example of a restaurant at the Restaurant Location 108A, the program 202 may provide access to the Restaurant Profile 210A to the destination device 116A. The destination device 106A may obtain information stored as part the Restaurant Profile 210A, such as credit card information, number of seats requested, etc. The information obtained from the Restaurant Profile 210A may be displayed to a user of the destination device 116A (e.g., an employee of the restaurant) or may be used by the destination device 116A to take corresponding action. The corresponding action may be, in this example, reserving a number of seats in the restaurant's reservation system, where the number of seats is equal to the number of seats requested as indicated in the Restaurant Profile 210A.

The user device 104 may have a proximity 112 to the destination location 108, and/or to the destination device 116 at the destination location 108. The proximity 112 may be a geographical proximity, or a temporal proximity based on the geographical proximity. The proximity may be a single value or may be a range of values, such as one or more latitude and longitude coordinates. The proximity may also be relative value, such as "10 feet away from" a given location.

The proximity value may be associated with one or more destination locations 116, and may be defined differently for each of the destination locations 116 with which the proximity 112 value is associated. A proximity 112 value may be associated with a particular destination device 116, destination location 108, and/or a user profile 250 or a part thereof. The proximity 112 may be defined by the user device 104 (e.g., through an operator of the user device 104).

An example of a temporal proximity value of the user device 104 may include: 10 minutes from destination location 108. This temporal proximity may be determined, for example, by calculating an average time required to reach the second location from GPS coordinates of the user device 104 at the user device location 106 when travelling 60 miles per hour.

Illustrative examples of the proximity of the user device 104 to a destination location, as depicted in FIG. 1, include: a proximity 112A to the Restaurant Location 108A, a proximity 112B to the Hospital Location 108B, a proximity 112C to the Vehicle Rental Location 108B, and a proximity 112D to a Retail Outlet Location 108D.

The user device 104 and the destination device 116, which may be located at the destination location 108 (for example, at the Restaurant Location 108A) or at a different location, may communicate via a Cloud system 220, which may include, for example, a server operatively connected to the user device 104 and to the destination device through a network. The network may include, without limitation, an internet network and/or a cellular network. Additional embodiments are discussed in greater detail in connection with FIGS. 4-7, below.

In another embodiment (not shown), the user device 104 and the destination device may communicate directly without going through a server or the Cloud system 220, using, for example, a Bluetooth protocol.

Each of the user device 104 and the destination device(s) 116, as well as the user device location 106 and the destination location(s) 108, may be monitored, tracked, or detected by a monitoring system (not shown). The monitoring device/system may include one or more monitoring devices (not shown). In one embodiment, the monitoring devices of the monitoring system may be integrated into the user device 104 and/or the destination device(s) 116. The monitoring system may be the same as, or a part of, the Cloud system 220.

According to an exemplary embodiment, the monitoring system may be a cellular network, and the user device 104 may be a smart phone. The destination device 116 may register an ID of the user device 104 with the cellular network, such that each time the user device 104 is detected by the cellular network as being within a geographic proximity of a destination location 108, the destination device 116 receives a notification (e.g., by text message) that informs the destination device 116 of the user device's 104 location.

In a related embodiment, the monitoring system may be the destination device 116, wherein the destination device 116 is capable of detecting the user device 104. In one example, detection of the user device 104 by the destination device 116 may be by way of using a Bluetooth protocol.

It will be apparent to one of ordinary skill in the art that other tracking, and monitoring systems may be used without departing from the spirit or scope of the present disclosure.

One or both of the user device 104 and/or the Cloud system 220 may also include a program 202 that provides functionality for granting access, to the profile 250 or a constituent profile (e.g., a profile 210 depicted in FIG. 2) associated with the user device 104, to one or more of the destination devices 116. Accordingly, the destination device 116 may access the user profile 250 or a constituent profile 210, when access to that profile is granted by the program 202.

The program 202 may also terminate the access, to the user profile 250, to the destination device 116, as described below in connection with FIG. 3.

The program 202 may detect, in step 304, that the user device 104 at the user device location 106 is within a proximity 112 (FIG. 1) of a destination location 108 (FIG. 1), which may be a geographic location of the destination device, or another geographic location. The detection by the program 202 may include, for example, receiving an indication from a monitoring system, as described above, indicating that the user device 104 is with the proximity 112 of the destination location 108. The destination location 108 may be, for example, the Restaurant Location 108A. The proximity 112 may be, for example, the proximity 112A. The user device location 106 and the destination location 116 may be the same location, for example, where the user device 104 is at the destination location 116.

The program 202 may, in step 308, provide access to a first user profile, associated with the user device 104, to a second device. The first user profile may be, for example, the user profile 250 associated with the user device 104, or a subset of the user profile 250, such as the Restaurant Profile 210A. The second device may be, for example, a destination device 116. The destination device 116, as described above, may be a computer at the destination location 108, or a computer associated with the destination location 108. The program 202 may identify the destination device 116 and determine if it is associated with any profile 210 (FIG. 2) in the user profile 250. For example, the program 202 may determine whether the destination device 116A at the Restaurant Location 108A is associated with a corresponding profile 210 in the user profile 250. Upon determining that such a profile association exists, the program 202 may provide access to the identified profile 210 by the destination device.

The program 202 may be a computer program embodied on a tangible storage device of the user device 104, or of a device that is part of the Cloud system 220, or both.

In a related embodiment, the program 202 may be, for example, a web service available to the destination device 116 and/or a program thereon. The destination device 116 may access the web service by providing identifying information of the user device 104 to the Cloud system 220 upon detecting the user device 104. The destination device 116 may query user profile 250 information associated with the user device 104 (or a constituent profile, such as those depicted in FIG. 2) using an expiring token provided to the destination device via the web service.

Figure 3:
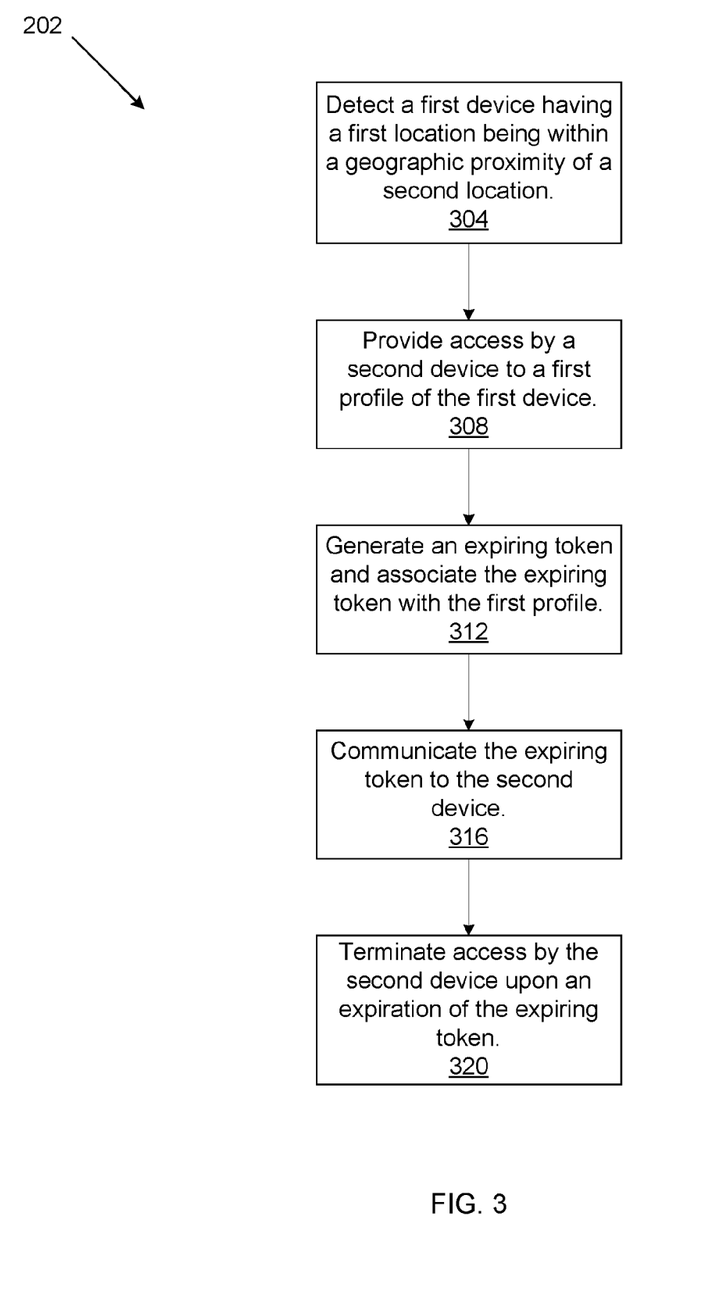
FIG. 3 is a flowchart depicting functions of a program, according to an aspect of the present disclosure.

Referring now to FIGS. 1 and 3, according to an exemplary embodiment of the present disclosure, the program 202 (FIG. 1) may reside on a tangible storage medium on a first device, such as the user device 104 (FIG. 1) or on the Cloud system 220 (FIG. 1). In a related embodiment, the functionality of the program 202 may be distributed and/or duplicated among the user device 104 and the Cloud system 220, and/or a second device, such as the destination device(s) 116, in communication with the user device 104 and/or with the Cloud system 220.

The program 202 may limit access to the user profile 250 or a part thereof by the destination device. Accordingly, in step 312, the program 202 may generate an expiring token and associate the expiring token with the profile 210 (FIG. 2) to which access is granted in step 308. This profile 210 may be, for example, the Restaurant Profile 210A. The expiring token may be associated with the profile 210 to which access is provided, in step 316. The expiring token may be an electronic artifact or object with a unique ID. In each instance where the destination device 116 attempts to access the user profile 250 (or a constituent profile thereof), the program 202 may require that the destination device 116 provide the unique ID of the expiring token. The program 202 may grant access to the user profile 250 (or a constituent part thereof) where the unique ID matches a required unique ID, and where the expiring token has not expired.

The expiring token may be transmitted to the destination device 116 by the program 202. The destination device 116 may use the expiring token to access the user profile 250 (or a part thereof to which the destination device has access) with which the token is associated, on the user device 104 or on the Cloud system 220, where the user profile 250 is stored. The user device 104 may be pre-configured such that a user of the user device 104 is prompted to allow generation of the expiring token upon detecting that the user device 104 is within the geographic proximity to the location in question. This may be accomplished using, for example, a user interface displayed to the user of the user device 104 via the program 202 or via another program.

The token may expire according to a token expiration policy of the program 202. The token expiration policy may be defined dynamically. For example, the token may be set to expire upon the user device 104 leaving the geographic area wherein the presence of the user device 104 first triggers execution of the program 202, or upon the proximity of the user device location 106 of the user device 104 from the second location exceeding a threshold value. This may be, for example, upon the user device 104 leaving the Restaurant Location 108A (e.g. a user of the user device 104 leaves the restaurant while carrying the user device 104), the Hospital 108B, or the Vehicle Rental Location 108B. In a related embodiment, the expiring token may include a timer and be set to expire (t) minutes after it is generated. The duration (t) may be dynamically set by the user device 104 during runtime of the program 202. The token expiration policy may also be defined by a user dynamically during runtime, and the user may opt to select expiration by time, location change, or both. Accordingly, upon generation, the timer of the expiring token may begin a countdown to zero, and may expire upon reaching zero. A user of the user device 104 may manually cause the token to expire. Other token exchange and expiration policies are possible.

Depending on the token expiration policy used, as described above, the program 202 may terminate access to the user profile 250 (or to a portion thereof to which access was provided) by the destination device, in step 320, such that the user profile 250 is no longer accessible by the destination device. Additional safeguards may be implemented to ensure that the information is not retained by the destination device.

In other steps (not shown), the program 202 may receive information via the user device 104, the destination device, and/or the Cloud system 220, to update the user profile 250. Such information may correspond to, for example, an experience of a user of the user device 104 while at a location such as the Restaurant Location 108A. For example, the user of the user device 104 may have a new dining preference and may indicate this new dining preference to a user of the destination device, such as an employee of the restaurant at the Restaurant Location 108A. The user of the destination device may input the new dining preference directly or indirectly to the destination device. The destination device may communicate the new dining preference to the program 202 via the Cloud system 220 or directly to the user device 104. In a related embodiment, the new dining preference may be input into the user device 104. Updating information associated with a shared user profile need not be by way of user input. It may be done automatically. For example, if the destination device detects that a new credit card is used to pay for a meal at the Restaurant Location 108A, the new credit card information may automatically be transmitted by the destination device to the user device 104 and/or the Cloud system 220, through, for example, the program 202.

Irrespective of the manner of detection and/or input and which device receives and/or communicates the input, the corresponding information may be used by the program 202 to update the user profile 250 or a constituent profile 210 (FIG. 2) thereof.

Access to the user profile 250 by the destination device for the purpose of updating the user profile 250 may be limited in the same manner as access to retrieve information from the user profile 250 is limited. In other words, while the expiring token is not expired and access is not terminated, the user profile 250 may be updated. Where an update to the user profile 250 is initiated by or via the destination device, the program 202 may tentatively process the update subject to an affirmative approval indicated by or via the user device 104 (for example, upon the user's approval indicated through an input to the user device 104).

Non-limiting benefits of embodiments of the present disclosure include allowing the automated exchange of information between the user device 104, which may be operated by a user, and a destination device, which may be operated by a second user, such as a business or service provider that permits the business to provide a customized experience to the user in an efficient manner. This allows the user device 104 to share information seamlessly via the but discretely, so that only information that is associated with the destination device or the second location is shared. The user of the user device 104 need not specify which information to share each time the user visits the second location, because the information shared is context specific. The user device 104 and/or the user can decide what information is shared in a given context. Accordingly, the destination device and/or a user of the destination device will only have access to the user profile information of the user device 104 temporarily. Not only does this allow the user device 104 information to be shared selectively depending on context, it also allows the destination device to access and use information that is current and most useful, rather than storing information that my be stale.

Although discussions of the various embodiments of the present disclosure have involved using these embodiments for the purpose of maintaining confidentiality, such purpose does not limit the spirit or scope of the present disclosure, and other uses are expressly contemplated.

Furthermore, although discussions of some of the embodiments above have included one or more users, the functions described may be performed automatically and do not require manual input, and may be performed in an entirely automated manner.

Figure 4:
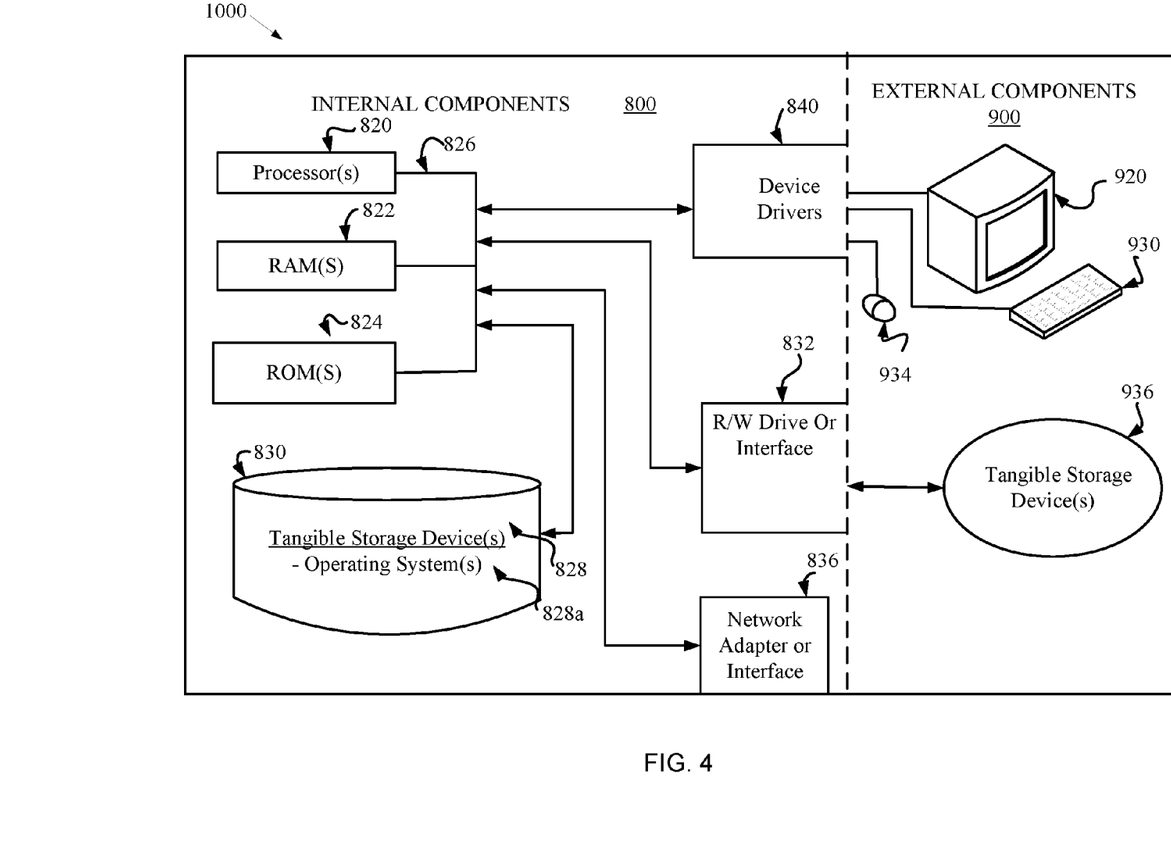
FIG. 4 is a schematic block diagram of a computer system, according to an aspect of the present disclosure.

Referring now to FIG. 4, a computing device 1000 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications 828a (e.g., device driver modules) executing the method 300; and one or more computer-readable tangible storage devices 830. The one or more operating systems 828 and device driver modules 840 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
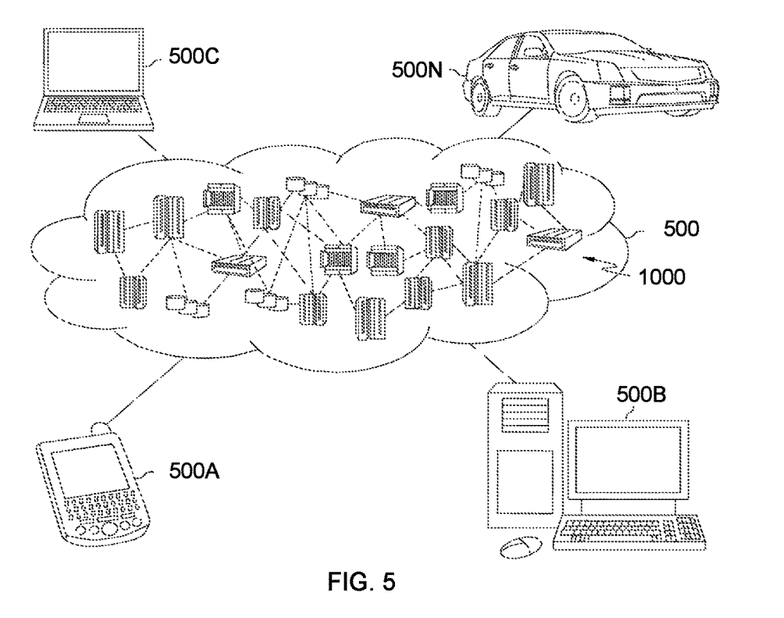
FIG. 5 is a block diagram of an illustrative cloud computing environment, according to an aspect of the present disclosure.

Referring now to FIG. 5, an illustrative cloud computing environment 500 is depicted. As shown, the cloud computing environment 500 comprises one or more cloud computing nodes, each of which may be a system 1000 with which local computing devices used by cloud consumers, such as, for example, a personal digital assistant (PDA) or a cellular telephone 500A, a desktop computer 500B, a laptop computer 500C, and/or an automobile computer system 500N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that the computing nodes 1000 and the cloud computing environment 500 can communicate with any type of computerized device over any type of network and/or network addressable connection (e.g., using a web browser).

Figure 6:
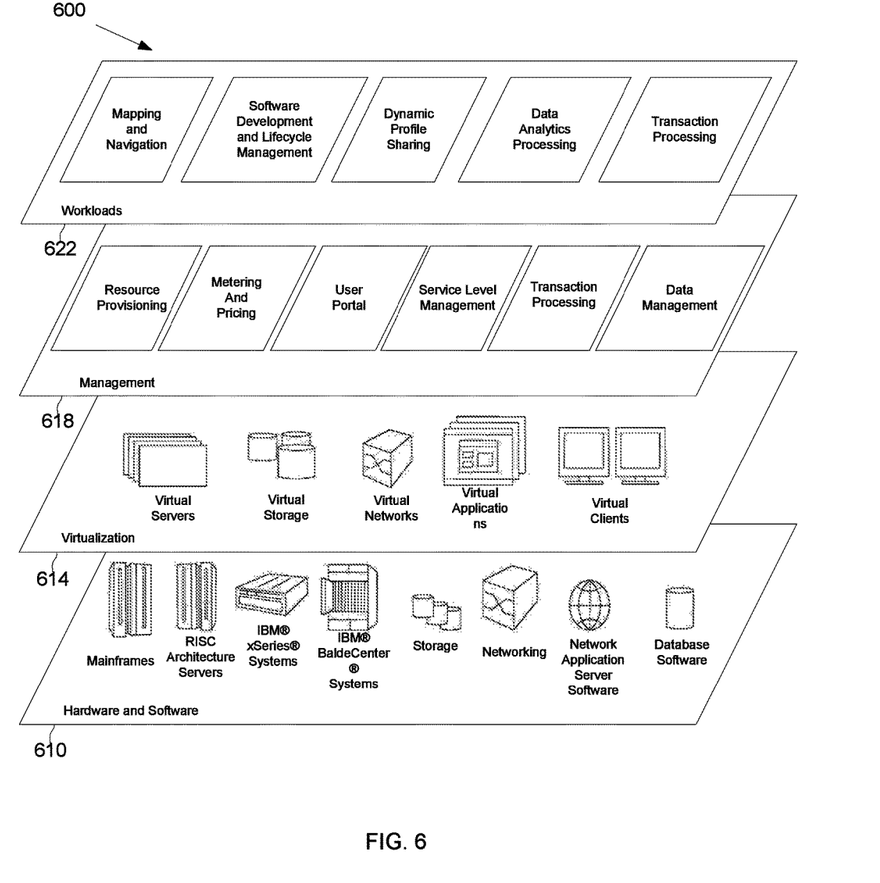
FIG. 6 is a block diagram of functional layers of the illustrative cloud computing environment of FIG. 5, according to an aspect of the present disclosure.

Referring now to FIG. 6, a set of functional abstraction layers provided by the cloud computing environment 600 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 610 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 614 provides an abstraction layer from which the following examples of virtual entities may be provided: virtual servers; virtual storage; virtual networks, including virtual private networks; virtual applications and operating systems; and virtual clients.

In one example, the management layer 618 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 622 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a dynamic profile sharing component that provides the functionality provided by embodiments of the present disclosure described in FIGS. 1-3.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer program product for dynamically sharing a user profile of a user device, comprising a tangible storage device having program code embodied therewith, the program code executable by a processor of a computer to perform a method comprising:

providing, by the user device, to a destination device, access to the user profile of the user device, upon detecting that a location of the user device is within a proximity of the destination device, wherein providing access to the user profile comprises receiving an input from a user of the user device to select the user profile from among a plurality of user profiles, wherein providing access to the user profile comprises prompting the user to allow generation of an expiring token and receiving an input from the user indicating permission to generate the expiring token, wherein the user profile includes at least one of electronic medical records, dining preferences, driving records, or shopping preferences, wherein the proximity is configurable by the user device, wherein the location is defined as a geographic area centered on a pair of latitude and longitude coordinates;

generating, by the user device, the expiring token comprising a unique identification code, wherein expiration of the expiring token occurs upon detecting at least one of the proximity exceeding a threshold value or a defined time elapsing since generating the expiring token, wherein the defined time comprises a duration dynamically set by the user device during runtime of the method on the computer, and wherein the expiration of the token is further based on a token expiration policy defined by the user device during runtime, the token expiration policy comprising a selection by the user device of an expiration by time, location change, or both;

associating, by the user device, the expiring token with the user profile;

communicating, by the user device, the expiring token to the destination device, performing, by the user device, at least one of the following: denying access to the user profile in response to receiving a communication from the destination device lacking the unique identification code; or updating the user profile in response to receiving the unique identification code and information corresponding to the user profile from the destination device; and terminating, by the user device, the access to the user profile, provided to the destination device, upon an expiration of the expiring token.

* * * * *